Feb. 26, 1929.                                                        1,703,100
C. P. DUBBS
PROCESS FOR CONVERTING HYDROCARBON OILS
Filed Oct. 31, 1921
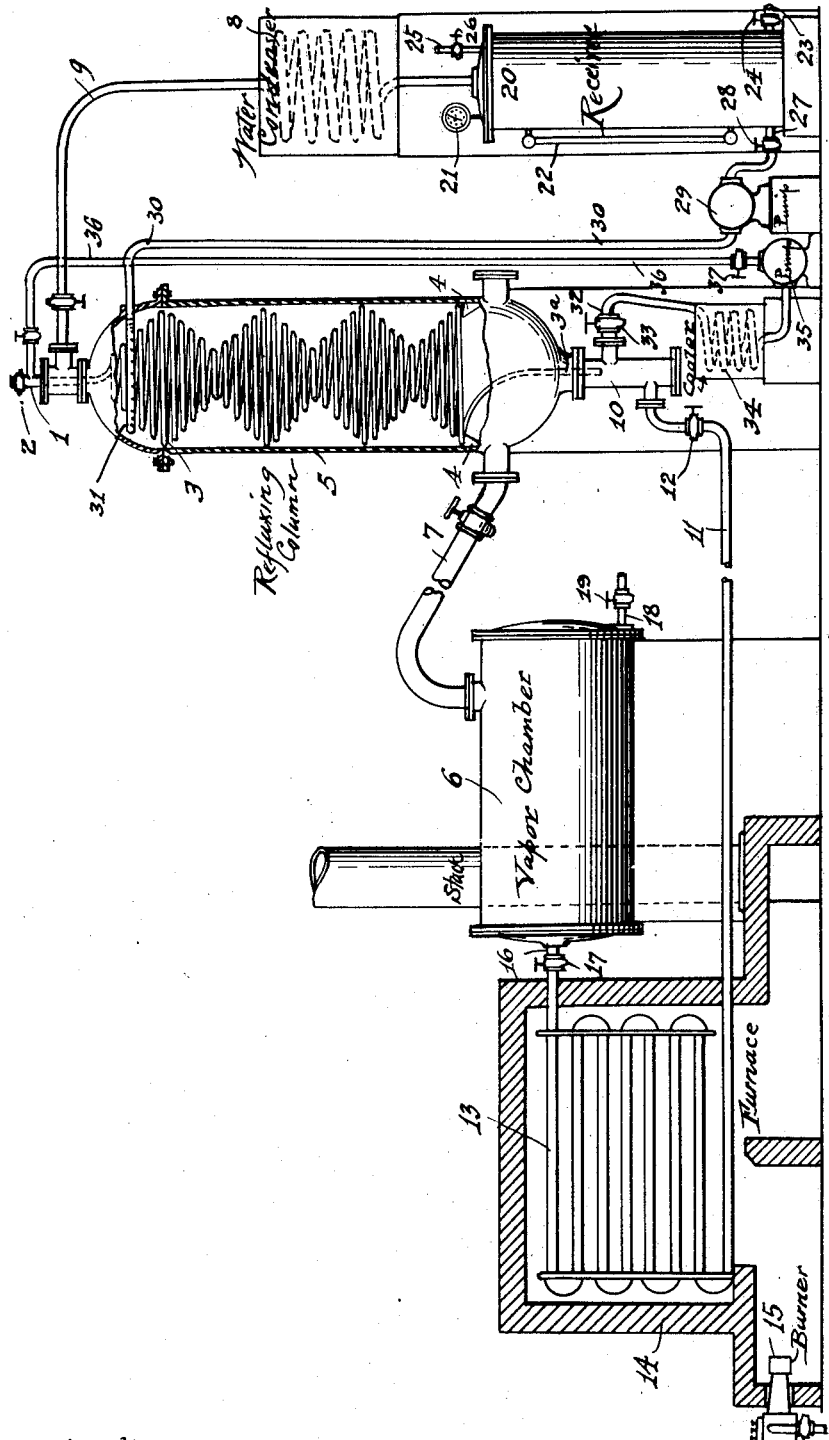
Witness,
D. B. Mann
Inventor,
Carbon P. Dubbs.
By Frank L. Belknap, Atty.

Patented Feb. 26, 1929.

1,703,100

UNITED STATES PATENT OFFICE.

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA.

PROCESS FOR CONVERTING HYDROCARBON OILS.

Application filed October 31, 1921. Serial No. 511,760.

This invention relates to improvements in process and apparatus for converting oils and refers more particularly to a process for converting relatively high boiling point oils to oils having the characteristics of gasoline or the like.

Among the salient objects of the invention are to provide a process in which the oil vapors are utilized to preheat the incoming raw oil and simultaneously therewith being refluxed by the raw oil to relieve from the vapors the higher boiling point fractions; to provide a process in which the raw oil is introduced into the refluxing column and circulated therethrough in a closed tube, whereby the raw oil is preheated and at the same time, acting as a refluxing medium in this refluxing stage; to provide a process in which the distillate recovered from the conversion of the oil is returned and introduced to the refluxing stage to assist the raw oil as a refluxing medium and a process in which an improved quality of distillate is recovered and less trouble encountered by the production of carbon in the refluxing zone and the connecting lines therewith; to provide an apparatus for carrying out this process and in general to provide a process and apparatus of the character referred to.

The single figure is a side elevational view of the apparatus.

Referring in detail to the drawings, the oil to be treated is introduced from any convenient source through the inlet pipe 1, which is controlled by a valve 2 and is circulated through the continuous coil pipe 3 mounted on supports 4 in the refluxing column 5. The raw oil passing through its coil serves as a refluxing medium to the oil vapors which rise through the column in their travel from the vaporizing chamber 6 through the vapor line 7 to the water condenser 8 through the line 9. The oil, besides dephlegmating the cracked oil vapors is preheated and flows into a lower well 10 from the extremity of the coil shown at 3ª. The preheated oil is drawn off from the well 10 through the pipe 11 controlled by a valve 12 through which it is directed to the heating coils 13, mounted in a furnace 14, which is preferably heated by gas burners 15. This heating zone may consist either of tubes or other type of heating means.

The preheated oil, after being raised to a cracking temperature in the heating zone, passes into the vaporizing chamber 6 through the transfer line 16, in which is interposed a pressure valve 17. The vapors as explained rise into the vapor line 7, thence through the dephlegmating column 5 and out through the line 9 to the top of the column through the line 9 to the water condenser 8, while the residual and unvaporized portion of the oil may be drawn off as desired through the line 18, controlled by a valve 19. This latter drawoff line may be used to maintain a constant level in the vaporizing chamber and to prevent an excessive accumulation of carbon therein. The vapors condensed in the water condenser are collected as distillate in the receiver 20 which is equipped with a pressure gauge 21, and liquid level gauge 22, and liquid drawoff line 23 controlled by a valve 24 and a pressure relief pipe 25 regulated by a valve 26.

An alternative disposition of the pressure distillate is supplied by drawoff line 27 controlled by a valve 28, whereby the distillate may be charged to a pump 29 and forced into the vertical pipe 30 which directs the oil to a circular spray pipe 31. By means of this latter spray pipe, the pressure distillate may be introduced into the top of the dephlegmator or refluxing column and thereby assist the raw oil in its refluxing function. It will be noted that the pressure distillate is sprayed in a finely divided condition directly into the refluxing column so that the liquid particles come in direct contact with the oil vapors while the raw oil is circulated in a closed tube in the same column. The advantage of this method of dephlegmation is that the pressure distillate which is returned has a very refractory character and is not easily converted while the incoming oil contains a large amount of the lighter fractions which are immediately separated from the oil body when the raw oil comes in contact directly with the heated vapors. As a consequence, where the raw oil is intermixed in the dephlegmating column with the oil vapors, it has been found that there is a substantial accumulation of objectionable free carbon which collects in the column and decreases materially the efficiency of dephlegmation.

In the process shown, this raw oil is contained in a closed tube and any conversion which may take place will be effected in the tube and any carbon that may be separated will be carried down in suspension with the raw oil and will be collected in the well 10 at the bottom of the dephlegmator. The pressure distillate, on the other hand, being a refractory oil, is not converted by the temperature of the vapors but may be mixed directly with the heated oil vapors. The combination of these two means of dephlegmation combined with what dephlegmation may be accomplished by aerial radiation serve as a very accurate means for controlling the temperatures in the dephlegmating column, and decrease materially the necessary size of the refluxing stage for a given amount of oil.

A second drawoff line 32 controlled by a valve 33 furnishes a means for drawing off the raw oil and distillate which may collect in the bottom of the dephlegmator, this latter line being connected to a cooler 34 through which the oil is conducted to a pump 35 and thence charged through a line 36 controlled by a valve 37 to the inlet raw oil pipe 1. By means of this latter circulating system, the oil may be drawn off from the bottom of the dephlegmator or regulated quantities of the oil charged back into the raw oil line, whereby an auxiliary control of the temperature in the refluxing column may be affected. This process, besides, furnishing a continuous supply of preheated raw oil to the heating zone, utilizes the heat lost in reflux condensation in this preheating stage, and by a recirculation of the pressure distillate and the combined pressure distillate and raw oil, tends to improve the quality of the distillate to extract an increased portion of the lighter fractions from the oil.

By treating mid-continent gas oil of approximately 32 degs. Baumé and rerunning the distillate which averages between 40 to 50% recovered from the process, a high grade uniform distillate is finally recovered having a gravity of from 48 to 52 degs. Baumé and by the introduction of the raw oil in a closed tube as shown, the quantity of wildcat fractions passing over to the receiver was materially reduced and the collection of the carbon in the dephlegmator substantially eliminated.

I claim as my invention:

1. A process for converting hydrocarbon oil, consisting in subjecting the oil to cracking conditions of temperature and pressure in a heating zone, in passing the evolved vapors to a dephlegmating zone, in dephlegmating the vapors by introducing into the dephlegmating zone in physical contact with the vapors a refractory distillate which will substantially completely vaporize but will not undergo any substantial cracking reaction at the temperature maintained in the dephlegmating zone, to flow through a substantial portion of the dephlegmating zone, in augmenting the dephlegmation of the vapors by passing a less refractory oil in a closed conduit through the dephlegmating zone, and in charging such less refractory oil to said heating zone.

2. A method for treating hydrocarbon oils comprising passing the oil to a heating zone wherein it is subjected to cracking conditions of temperature and pressure, passing vapors evolved from the oil to a dephlegmating zone, simultaneously introducing to the dephlegmating zone a highly refractory oil lighter than condensate separated from vapors in said dephlegmating zone and a less refractory oil, causing the highly refractory oil to flow in physical contact with vapors through the dephlegmating zone, causing the less refractory oil to flow through the dephlegmating zone out of physical contact with the vapors, removing uncondensed vapors from the dephlegmating zone, uniting said less refractory oil subsequent to passage through such dephlegmating zone with condensate separated from vapors in said dephlegmating zone and continuously supplying the resulting mixture to said heating zone.

CARBON P. DUBBS.